United States Patent
Maisch et al.

(10) Patent No.: US 12,410,955 B2
(45) Date of Patent: Sep. 9, 2025

(54) PROPORTIONAL VALVE ASSEMBLY FOR REFRIGERANTS

(71) Applicant: ECO Holding 1 GmbH, Marktheidenfeld (DE)

(72) Inventors: Dieter Maisch, Kohlberg (DE); Hartmut Weber, Altdorf (DE)

(73) Assignee: ECO Holding 1 GmbH (DE)

( * ) Notice: Subject to any disclaimer, the term of this patent is extended or adjusted under 35 U.S.C. 154(b) by 78 days.

(21) Appl. No.: 18/265,301

(22) PCT Filed: Oct. 13, 2021

(86) PCT No.: PCT/EP2021/078338
§ 371 (c)(1),
(2) Date: Jun. 5, 2023

(87) PCT Pub. No.: WO2022/128203
PCT Pub. Date: Jun. 23, 2022

(65) Prior Publication Data
US 2024/0035721 A1    Feb. 1, 2024

(30) Foreign Application Priority Data

Dec. 18, 2020 (DE) .......................... 102020134259.4

(51) Int. Cl.
*F25B 41/20* (2021.01)
*F16K 11/044* (2006.01)
(Continued)

(52) U.S. Cl.
CPC ............ *F25B 41/20* (2021.01); *F16K 11/044* (2013.01); *F16K 11/056* (2013.01); *F16K 31/047* (2013.01); *Y10T 137/86622* (2015.04)

(58) Field of Classification Search
CPC .... F16K 11/044; F16K 11/056; F16K 27/029; F16K 27/0263; F16K 31/0627;
(Continued)

(56) References Cited

U.S. PATENT DOCUMENTS 3,329,165 A * 7/1967 Lang ..................... F16K 27/029
                                                        137/625.5
3,682,198 A * 8/1972 Davis .................. F16K 31/5286
                                                        137/625.25
(Continued)

FOREIGN PATENT DOCUMENTS

CN     106981186 A    7/2017
EP     0058569 A1     8/1982
(Continued)

OTHER PUBLICATIONS

JP2013221578A English language machine translation.
CN106931186A English language machine translation.

*Primary Examiner* — Robert K Arundale
(74) *Attorney, Agent, or Firm* — Lerner David LLP

(57) ABSTRACT

This disclosure relates to a proportional valve arrangement for refrigerant, with a valve housing having a valve body chamber, a valve body which is arranged within the valve body chamber and configured to be transferable between a first position and a second position. The valve housing includes a first sealing seat and a second sealing seat, and the valve body which is transferable between the first sealing seat and the second sealing seat.

10 Claims, 5 Drawing Sheets

(51) Int. Cl.
*F16K 11/056* (2006.01)
*F16K 31/04* (2006.01)

(58) Field of Classification Search
CPC ....... Y10T 137/86702; Y10T 137/8671; Y10T 137/8662; Y10T 137/86879
See application file for complete search history.

(56) References Cited

U.S. PATENT DOCUMENTS

| | | | | | |
|---|---|---|---|---|---|
| 3,884,266 | A | * | 5/1975 | Kondo | F16K 11/056 137/625.27 |
| 4,026,325 | A | * | 5/1977 | Loveless | F16K 11/044 137/625.69 |
| 4,365,383 | A | * | 12/1982 | Bartlett | F16K 11/044 15/312.1 |
| 4,561,468 | A | | 12/1985 | Kreitchman | |
| 4,611,631 | A | * | 9/1986 | Kosugi | F16K 31/0627 137/625.65 |
| 4,962,791 | A | * | 10/1990 | Rott | F16K 11/056 137/625.49 |
| 5,111,840 | A | * | 5/1992 | Miller | F16K 27/029 137/625.25 |
| 6,488,050 | B1 | * | 12/2002 | Jabcon | F16K 11/044 137/625.65 |
| 8,783,653 | B2 | * | 7/2014 | Jamison | F16K 31/0627 137/625.2 |
| 2006/0065315 | A1 | * | 3/2006 | Neff | F16K 11/044 137/625.65 |
| 2008/0245427 | A1 | * | 10/2008 | Williams | F16K 31/0627 137/625.25 |
| 2012/0012768 | A1 | * | 1/2012 | Yahr | F16K 11/065 251/129.11 |
| 2012/0017997 | A1 | * | 1/2012 | Ho | F16K 11/044 251/324 |
| 2013/0340849 | A1 | * | 12/2013 | Peel | F16K 11/22 137/341 |
| 2014/0034167 | A1 | * | 2/2014 | Wodara | F16K 11/044 137/625.48 |
| 2018/0180192 | A1 | * | 6/2018 | Jamison | F16K 27/029 |
| 2024/0271709 | A1 | * | 8/2024 | Landacre | F16K 27/029 |

FOREIGN PATENT DOCUMENTS

| | | |
|---|---|---|
| EP | 0907045 A1 | 4/1999 |
| EP | 2700853 A1 | 2/2014 |
| JP | 2013221578 A | 10/2013 |

\* cited by examiner

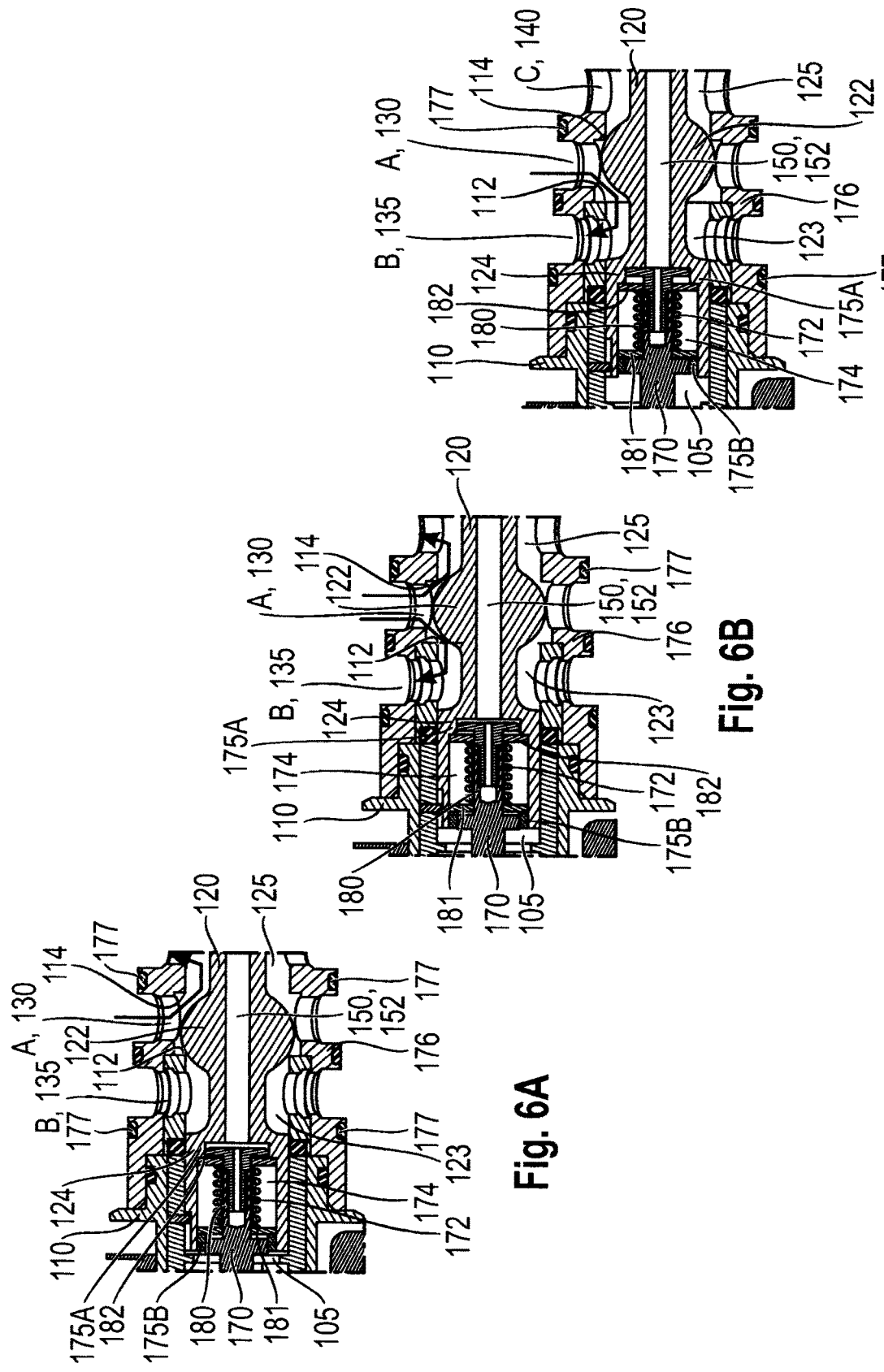

PROPORTIONAL VALVE ASSEMBLY FOR REFRIGERANTS

CROSS REFERENCE TO RELATED APPLICATIONS

This application is a national phase application of International Application No. PCT/EP2021/078338, filed Oct. 13, 2021, and claims the priority benefit of European patent applications DE102020134259.4 filed on Dec. 18, 2020, the content of the aforementioned being incorporated herein by reference.

BACKGROUND OF THE INVENTION

Field of the Invention

The invention relates to a proportional valve arrangement for refrigerant, with a valve housing comprising a valve body chamber, a valve body which is arranged within the valve body chamber and is configured to be transferable between a first position and a second position.

Such proportional valve arrangements are used, for example, for fluid systems of at least partially electrically operated motor vehicles. Such proportional valves are also called continuous valves or directional control valves, whereby high demands are made at least in the area of motor vehicles.

Description of the Related Art

For example, the fluids can be applied in liquid or gaseous aggregate state. In addition, very high internal tightness requirements apply in both the liquid and gaseous state of the fluid. Likewise, these tightness requirements also apply externally. Consequently, the proportional valve arrangement must meet the conditions that there is no pressure-balanced connection to the valve and that no assured pressure reduction is guaranteed.

With large piston diameters it often occurs that large hydraulic or pneumatic forces are acting axially on the piston, especially in the case of large pressure differences in valves. This means that large actuating forces are needed to operate the valves. This is usually done by drives of corresponding size at corresponding cost.

BRIEF SUMMARY OF THE INVENTION

It is an object of the invention to provide a valve device belonging to the technical field mentioned at the beginning, which at least partially overcomes the disadvantages of the prior art. In particular, it is the object of the invention to propose a valve device which reduces the high actuating forces for valves with large cross-sections.

The solution to this object is defined by the features of claim 1. The invention relates to a proportional valve arrangement for refrigerants, with a valve housing comprising a valve body chamber, a valve body which is arranged within the valve body chamber and is configured to be transferable between a first position and a second position, wherein the valve housing comprises a first sealing seat and a second sealing seat, and the valve body is transferable between the first sealing seat and the second sealing seat.

Valves are generally used to shut off and/or control the flow of a fluid. Simpler valves can only be controlled discretely. This means that they can only be switched open/closed, i.e. they can only be opened and closed. However, simply opening and closing the valve is no longer sufficient for many applications. For example, the use as an expansion valve, which is used in battery cooling, air conditioning or heat pump systems in order to generate a defined and controllable pressure drop between the condenser (heat output) and the evaporator (cooling), often requires continuous switching. Overall, continuous switching is therefore often required. Such a continuous or steady switching can be done, for example, by means of proportional valves that allow a steady transition of the switching positions. This allows the volume flow of the fluid to be adjusted. With the help of a proportional solenoid, such proportional valves allow not only discrete switching positions, but also a continuous transition of the valve opening.

A refrigerant in the sense of the invention is to be understood as a fluid which is used for heat transfer in a refrigeration system and which absorbs heat at low temperature and low pressure and releases heat at higher temperature and higher pressure, whereby changes of state of the fluid usually take place.

This results, for example, in the technical advantage that the proportional valve arrangement can precisely take up any position of the valve body between the first sealing seat and the second sealing seat. This results in the further advantage that the proportional valve arrangement can be switched continuously and the volume flow can be controlled precisely. There is also the advantage that a stepper motor, for example, is suitable as a drive for the proportional valve arrangement, thus eliminating the need for a return spring or the like to close the proportional valve arrangement.

According to a preferred embodiment, the valve body comprises a spherical section which is arranged to be transferable between the first sealing seat and the second sealing seat. This results, for example, in the technical advantage that optimum sealing is always ensured both in the abutment in the first sealing seat and in the abutment in the second sealing seat. The symmetry of the spherical body results in a mode of operation with little wear, since the orientation of the valve body when entering the first sealing seat or the second sealing seat is independent of the function. In other words, the spherical seat ensures sealing even when the valve body is in a tilted position. For example, both the spherical section of the valve body and the sealing seat are made of a metallic material. For example, aluminium or stainless steel is suitable for both the sealing seat and the spherical valve body. An additional advantage is that there are only very small abutment surfaces between the spherical valve body and the sealing seat. This additionally reduces wear and improves the sealing and locking reliability of the proportional valve arrangement.

According to an additional embodiment, the valve body comprises a first guide section and a second guide section for guiding the valve body in the valve housing, wherein the spherical section is arranged between the first guide section and the second guide section. Thereby, for example, the technical advantage is achieved that precise guidance of the valve body is possible and tilting of the valve body is prevented. This additionally leads to a further reduction in wear and thus to a longer service life of the proportional valve arrangement.

According to a particularly preferred embodiment, a first clearance is formed between the first guide section and the spherical section. The clearance is formed in that the diameter of the valve body in this section is smaller than in the first guide section or in the spherical section. This reduced diameter exposes a first clearance that can accommodate fluid and facilitates flow around the valve body between two adjacent ports. In addition, the first clearance increases the pressure contact area of the spherical section.

According to a particularly preferred embodiment, in a state in which the valve body abuts the first sealing seat, an axial projection surface of the first clearance in the direction of the first guide section comprises the same size as an axial projection surface of the first clearance in the direction of the spherical section. In other words, the diameter of the first sealing seat is identical to the diameter of the first guide section. This results, for example, in the technical advantage that the axial components of the projection surfaces are identical in this state, which results in a balanced force equilibrium of the valve body in the axial direction under fluid pressure. This force balance in turn makes it easier for the drive to move the valve body or to transfer the valve body from a first position to a second position.

A further consequence of this is in the event of a power failure or a defect in the drive. In such a case, the valve body would remain in its position, as it would not be moved to a rest position or closed position by a return spring.

According to another particularly preferred embodiment, a second clearance is formed between the second guide section and the spherical section. This clearance is also formed in that the diameter of the valve body in this section is smaller than in the second guide section or in the spherical section. This reduced diameter frees up a first clearance that can accommodate fluid and facilitates flow around the valve body between two adjacent ports. In addition, the second clearance increases the pressure contact area of the spherical section.

According to a further embodiment, in a state in which the valve body abuts the second sealing seat, an axial projection surface of the second clearance in the direction of the spherical section comprises the same size as an axial projection surface of the second clearance in the direction of the second guide section.

In other words, the diameter of the first sealing seat is identical to the diameter of the second guide section. This has the technical advantage, for example, that the axial components of the projection surfaces are identical in this state, which results in a balanced force equilibrium of the valve body in the axial direction under fluid pressure. This force compensation in turn makes it easier for the drive to move the valve body or to transfer the valve body from a first position to a second position. In connection with a pressure bypass, pressure compensation can also take place within the proportional valve device. Overall, the proportional valve device is thus pressure and force balanced. The pressure balance is thereby obtained by the pressure bypass and the pressurised surface equality, while the force balance results, for example, from the non-existent return element.

Also in this constellation, in the event of a power failure or a defect in the drive, the consequence is that the valve body would remain in its position, as it is not transferred to a rest position or closed position by a return spring.

According to a particular embodiment, the valve housing comprises an inflow port, a first outflow port and a second outflow port. Thereby, for example, the technical advantage is achieved that the use of the proportional valve arrangement is possible in a more flexible and in a more versatile way. For example, the proportional valve arrangement is designed as a 3/2 directional control valve. Thus, the proportional valve arrangement would have, for example, three connections arranged adjacent to each other. By transferring the valve body from the first sealing seat to the second sealing seat, fluid can flow from the inflow port into both the first outflow port and/or the second outflow port. Particularly in conjunction with the force-balanced constellation of the above embodiments, there is now the additional advantage that the valve body can be easily actuated regardless of the position between the first sealing seat and the second sealing seat. This also applies regardless of the fluid pressure situation that arises at the inflow and outflow ports. In other words, the valve body is configured to be force-balanced and thus easily adjustable for a drive, irrespective of the question of which pressure arises at which inflow and outflow ports. For example, this constellation of a 3/2 directional control valve can also be extended to other constellations.

In order to improve the force balance of the valve piston, the proportional valve arrangement comprises a pressure bypass which connects the second outflow port to the valve body chamber. Thereby, for example, the technical advantage is achieved that pressure equalisation through the piston is possible in a symmetrical manner and without an external bypass. This allows a compact construction and facilitates particularly simple manufacturing.

According to a further embodiment, the pressure bypass comprises a communication link through the valve body. For example, the communication link extends along the geometric longitudinal axis of the valve body. This achieves, for example, the technical advantage that the refrigerant can flow directly through the valve body. This results in a simple and symmetrical pressure compensation of the refrigerant, which altogether enables the force-balanced constellation of the valve piston. At the same time, this enables a simple and cost-effective production of the pressure bypass.

Particularly preferably, the proportional valve arrangement comprises an electrically operable drive for proportional actuation of the valve body. This achieves, for example, the technical advantage that a continuous adjustment of the valve body is possible. For example, the drive comprises a stepper motor. The stepper motor does not need to apply much force here, as there is force compensation of the valve piston. The use of an electric drive is additionally advantageous in conjunction with a possible defect or with a power failure. In such a case, the valve body remains in the last position and is not moved to an end position or to a desired position due to the absence of a return spring and the prevailing self-locking.

According to another particular embodiment, the drive is at least partially arranged within the valve body chamber. For example, the rotor and the spindle driven by the rotor are arranged inside the valve body chamber. Thereby, for example, the technical advantage is achieved that a very compact construction is possible. In addition, leakages and leaks can be effectively reduced because the rotor and spindle are integrated in the valve body chamber and thus fewer seals and interfaces are necessary.

According to a particular embodiment, the drive comprises a stepper motor which is connected to the valve body via a spindle. This achieves, for example, the technical advantage that a direct and precise adjustment of the valve body is possible. If the power supply is lost or a defect occurs in the stepper motor, the valve body remains in the last position.

According to a further advantageous embodiment, the spindle is connected to a hollow shaft in a self-locking manner. In mechanics, self-locking describes the friction caused resistance against slipping or twisting of two bodies lying against each other. The self-locking is influenced by the angle of inclination, by the surface roughness of the contact surfaces, by the material pairing, by the lubricant and by the heating. The hollow shaft is firmly connected to the valve housing, whereby the spindle interacts with the hollow shaft via a thread. The rotation of the drive is transmitted to the spindle, which changes the axial position of the spindle. Self-locking is realised by the thread between the hollow shaft and the spindle, which achieves the technical advantage, for example, that no displacement of the valve body takes place even in the event of pressure differences.

According to a further variant, the invention relates to a proportional valve arrangement for refrigerants with a valve housing comprising a valve body chamber, a valve body which is arranged within the valve body chamber and is configured to be transferable between a first sealing seat and a second sealing seat, an electrically actuable drive, which is connected to the valve body via a spindle, wherein a locking device is arranged between the spindle and the valve body for generating an axial preload between the valve body and the first sealing seat when the valve body is in abutment with the first sealing seat and an axial preload between the valve body and the second sealing seat when the valve body is in abutment with the second sealing seat.

This results, for example, in the technical advantage that the proportional valve arrangement can precisely take up any position of the valve body between the first sealing seat and the second sealing seat. This results in the further advantage that the proportional valve arrangement can be switched continuously and the volume flow can be controlled precisely. In addition, there is the advantage that the locking device generates an axial preload both when the valve body is in contact with the first sealing seat and when the valve body is in contact with the second sealing seat, whereby a high degree of locking safety is provided. A further advantage arises in particular in connection with the spindle when the spindle moves the valve body into an end position. Here, the locking device prevents the valve body from jamming in the sealing seat in the end position. The locking device thus improves the function and service lifetime of the proportional valve arrangement.

According to a preferred embodiment, the valve body comprises a stepped mounting space for receiving the spindle and the locking device. This achieves, for example, the technical advantage that the proportional valve arrangement is configured in a particularly compact way. The spindle and locking device are at least partially integrated into the valve body. The stepped mounting space can be easily manufactured and the installation of the proportional valve arrangement is facilitated.

According to a preferred embodiment, the locking device comprises a spring element which is arranged coaxially with respect to the spindle. Thereby, for example, the technical advantage is achieved that the proportional valve arrangement is configured even more compactly. The spring element of the locking device here fulfils a double function. On the one hand, the spring element is configured to generate an axial preload between the valve body and the spindle when the valve body is in abutment with the first sealing seat. At the same time, the spring element is configured to generate an axial preload between the valve body and the spindle when the valve body is in abutment with the second sealing seat.

According to a further advantageous embodiment, the spring element is configured to cause an axial preload between the spindle and a first stop of the stepped mounting space. Thereby, for example, the technical advantage is achieved that the spindle can continue to move at least partially in the axial direction against the preload of the spring element when the valve body has already come into abutment with the second seal seat. Hereby, a defined locking pressure of the valve body is adjusted in the seat. Due to the coaxial arrangement of the spring element with the spindle, the axial movement of the spindle is thus damped, thereby preventing the valve body from jamming in the end position.

According to an additional embodiment, the spring element is configured to cause an axial preload between the spindle and a second stop of the stepped mounting space. Thereby, for example, the technical advantage is achieved that the spindle can continue to move at least partially in the axial direction against the preload of the spring element when the valve body has already come into abutment with the first seal seat. Due to the coaxial arrangement of the spring element with the spindle, the axial movement of the spindle is thus also damped in the opposite direction of movement, thereby preventing the valve body from jamming in the opposite end position and setting a defined closing pressure of the valve body in the seat.

According to a further advantageous embodiment, the spindle is connected to a hollow shaft in a self-locking manner. In mechanics, self-locking describes the friction caused resistance against slipping or twisting of two bodies lying against each other. Self-locking is influenced by the angle of inclination, by the surface roughness of the contact surfaces, by the material pairing, by the lubricant and by the heating. The hollow shaft is fixed to the valve housing, whereby the spindle interacts with the hollow shaft via a thread. The rotation of the drive is transmitted to the spindle, which changes the axial position of the spindle. The self-locking is realised by the thread between the hollow shaft and the spindle, which achieves, for example, the technical advantage that no displacement of the valve body takes place even in the case of pressure and force differences and even if the drive is switched in any stroke position without current.

According to an additional advantageous embodiment, the valve housing comprises an inflow port and at least one outflow port. For example, the valve housing comprises an inflow port and at least two outflow ports. In addition, further ports for inflow or outflow are also conceivable. Thereby, for example, the technical advantage is achieved that the use of the proportional valve arrangement is possible in a more flexible and versatile way. For example, the proportional valve arrangement is configured as a 3/2 directional control valve. Thus, the proportional valve arrangement would have, for example, three connections arranged adjacent to each other. By transferring the valve body from the first sealing seat to the second sealing seat, fluid can flow from the inflow port into both the first outflow port and/or the second outflow port. This also applies irrespective of the fluid pressure situation that arises at the inflow and outflow ports. In other words, the valve body is configured to be force-balanced and thus easily adjustable for a drive, regardless of the question of which pressure arises at which inflow and outflow ports. For example, this constellation of a 3/2 directional control valve can also be extended to other constellations.

According to another particularly advantageous embodiment, the proportional valve arrangement comprises a pressure bypass which connects the outflow port to the valve body chamber. Thereby, for example, the technical advantage is achieved that pressure compensation through the piston is possible in a symmetrical manner and without an external bypass. This allows a compact construction and enables a particularly simple and cost-effective manufacture of a force-balanced proportional valve arrangement. The effective pressurised surfaces on the valve body are configured in such a way that the surfaces which move the adjustment body to the right have the same size as the surfaces which pressurise it to the left. Via the bypass, the same pressure (pressure-balanced) is applied to the surfaces on the left and right, resulting in a force equilibrium on the adjustment body. This lay out design, in combination with a stepper motor and thus with no return element, results in a completely force-balanced system, so that the self-locking device does not have to hold any or only very low forces.

According to an embodiment based on this, the pressure bypass comprises a communication link through the valve body. For example, the communication link extends along the geometric longitudinal axis of the valve body. Therefore, for example, the technical advantage is achieved that the refrigerant can flow directly through the valve body. This results in a simple and symmetrical pressure compensation of the refrigerant, which altogether enables the force-balanced constellation of the valve piston.

According to a further preferred embodiment, the stepped mounting space for accommodating the spindle and the locking device is arranged in the communication link of the valve body. Thereby, for example, the technical advantage results that the proportional valve arrangement is configured in a particularly compact and space-saving manner. In addition, there is the advantage that the stepped mounting space is part of the communication link for the purpose of pressure equalisation, whereby at least a part of the spindle and the locking device are directly integrated into the bypass so that fluid can flow around them directly.

According to an additional embodiment, the valve body comprises a spherical section which is arranged in a transferable manner between the first sealing seat and the second sealing seat. Thereby, for example, the technical advantage results that an optimal sealing is always given in the abutment at the first sealing seat as well as in the abutment at the second sealing seat. The symmetry of the spherical body causes a functioning with little wear, as the orientation of the valve body when entering the first sealing seat or the second sealing seat is independent of the function. In other words, the spherical seat ensures sealing even when the valve body is in a tilted position. For example, both the spherical section of the valve body and the sealing seat are made of a metallic material. For example, aluminium or stainless steel is suitable for both the sealing seat and the spherical valve body. An additional advantage consists in the fact that there are only very small contact surfaces between the spherical valve body and the sealing seat. This additionally reduces wear and improves the sealing and locking reliability of the proportional valve arrangement.

In order to realise the most precise adjustment of the valve body, the drive is configured for proportional actuation of the valve body. Thereby, for example, the technical advantage is achieved that a continuous adjustment of the valve body is possible. For example, the drive comprises a stepper motor. The stepper motor does not need to apply much force here, as there is force compensation of the valve piston. The use of an electric drive is also advantageous in conjunction with a possible defect or power failure. In such a case, the valve body remains in the last position and is not transferred to an end position or to a desired position due to the lack of a return spring and the prevailing self-locking. This results, for example, in the additional advantage that energy can be saved by switching off the stepper motor in any stroke position. This is advantageous, for example, compared to solutions that are operated with a proportional solenoid, because a proportional solenoid must be permanently supplied with energy to hold a certain position of the valve body. The use of a stepper motor thus saves energy, which is particularly important in electromobility.

According to an additional embodiment, the drive is at least partially arranged within the valve body chamber. For example, the rotor and the spindle driven by the rotor are arranged within the valve body chamber. Thereby, for example, the technical advantage is achieved that a very compact construction is possible. In addition, leakages and leaks can be effectively reduced because the rotor and spindle are arranged integrated within the valve body chamber and thus fewer seals and interfaces are necessary.

According to an additional embodiment, the drive comprises a stepper motor. Thereby, for example, the technical advantage is achieved that a direct and precise adjustment of the valve body is possible. For example, the stepper motor is directly connected to the valve body via a spindle.

Another variant relates to a directional control valve, preferably for refrigerants, with at least two switching positions, the directional control valve comprises a valve housing and a valve piston axially displaceable within the valve housing along a longitudinal axis, as well as a drive axially moving the valve piston. The valve housing comprises radial ports, whereby two working ports are provided, between which a pressure port is arranged, whereby the valve piston is configured to be pressure balanced.

A first embodiment relates to a directional control valve, preferably for refrigerants, with at least two switching positions, comprising a valve housing and a valve piston axially displaceable within the valve housing along a longitudinal axis, as well as a drive axially moving the valve piston, wherein the valve housing comprises radial ports, wherein two working ports are provided between which a pressure port is arranged, whereby the valve piston is configured to be pressure balanced.

According to an advantageous embodiment, the valve piston comprises a spherical section, wherein the spherical section can be abutted against the pressure port on the valve housing for sealing the respective, non-pressurised working port.

According to a further embodiment, a second seal is provided for mutual sealing of the working ports.

According to a further embodiment, the second seal is provided as a double-acting rod seal or comprises two single-acting rod seals.

According to a further embodiment, an assembly acting in both actuating directions of the valve piston is provided in a stepped mounting space, wherein the assembly comprises a spiral spring which can be abutted against two counter bearings.

According to a further embodiment, a stop geometry is provided in order to limit a stroke of the directional control valve to a predetermined number of revolutions.

According to a further embodiment, a reduction gear is provided for sensitising an axial position of a drive spindle of the drive.

Further advantageous embodiments and combinations of features of the invention result from the following detailed description and the totality of the patent claims.

BRIEF DESCRIPTION OF THE SEVERAL VIEWS OF THE DRAWINGS

Further advantages, features, and details of the various embodiments of this disclosure will become apparent from the ensuring description of a preferred exemplary embodiment and with the aid of the drawings. The features and combinations of features recited below in the description, as well as the features and feature combination shown after that in the drawing description or in the drawings alone, may be used not only in the particular combination received, but also in other combinations on their own, without departing from the scope of the disclosure.

The drawings used to explain the embodiment show:

FIG. 6A, 6B, 6C further partial views of a proportional valve in various switching positions.

In principle, same parts are provided with the same reference signs in the figures.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that at least one of "A, B, and C" should not be understood as including only one of A, only one of B, only one of C, or any combination of A, B, and C.

Figure 1:
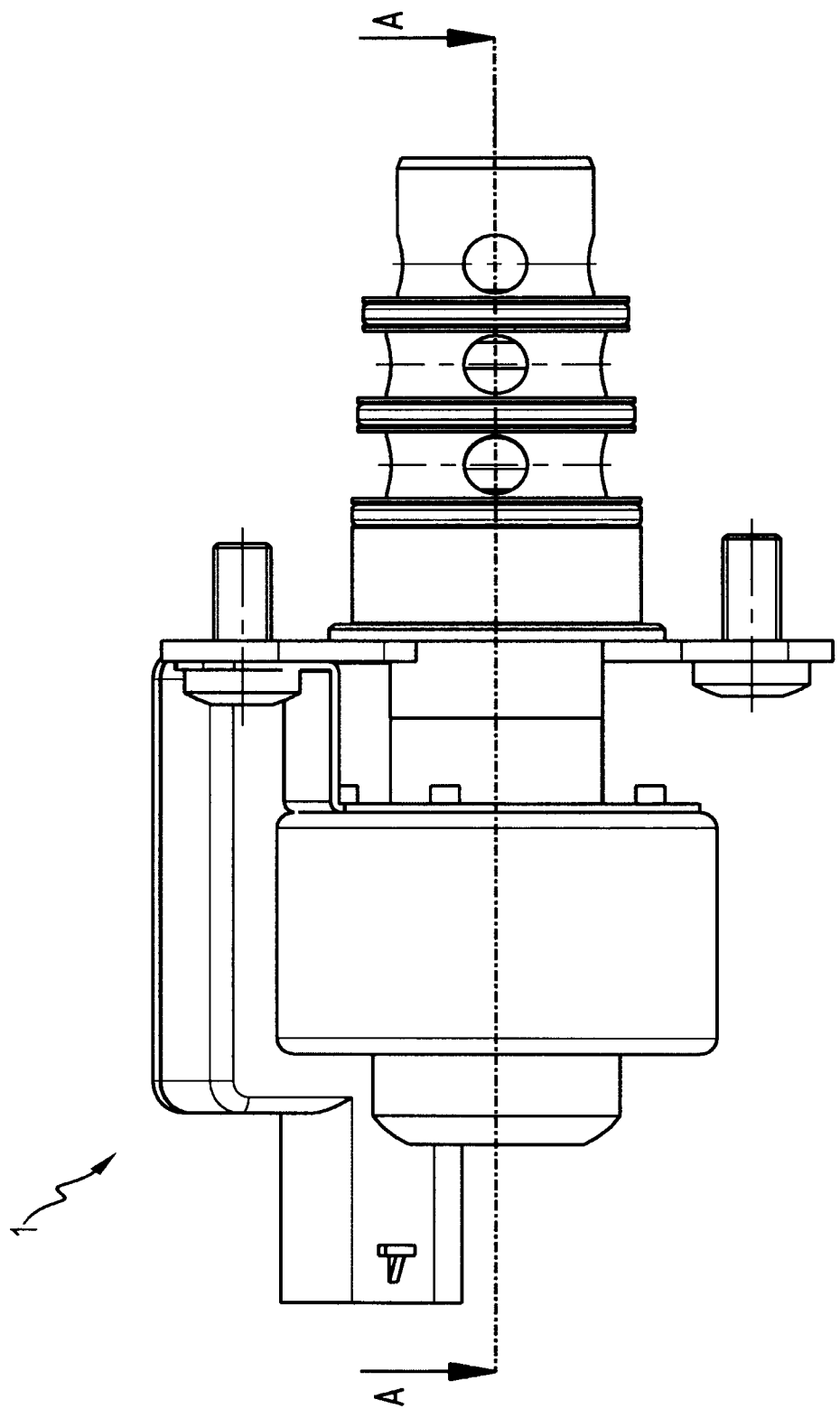
FIG. 1 a side view of a directional control valve according to the present invention.

FIG. 1 shows a side view of a 3/2 directional control valve 1 according to the invention. The directional control valve 1 is used, for example, as a refrigerant valve in a fluid system of an at least partially electrically operated vehicle. The directional control valve 1 comprises two switching positions and includes a valve housing 2 and a valve piston 3 axially displaceable along a longitudinal axis within the valve housing 2 as well as a drive 4 axially moving the valve piston. This drive 4 is provided, for example, by a motor 5 and comprises a hollow shaft 6 in which a central drive spindle 7 is arranged. The hollow shaft 6 is arranged in a drive housing 8, which is connected to the valve housing 2 in a sealed manner. The drive spindle 7 is driven by a rotor 9 of the motor 5, so that a rotational movement of the drive spindle 7 enables an axial movement of the valve piston 3. The valve housing 2, which is arranged in a housing 10, comprises three radial ports B, A, C, whereby two working ports B, C are provided, between which a pressure port A is arranged. With large piston diameters, it often occurs that large hydraulic/pneumatic forces acting axially on the valve piston 3, especially in the case of large pressure differences. This means that large actuating forces are necessary. These large actuating forces in turn must be provided by a correspondingly large drive. Since none of the working ports B, C can be relieved of pressure in a defined manner, it must be ensured that the resulting forces on the valve piston 3 which want to move it in a first actuation direction are just as great as the forces which want to move it in a second, opposite actuation direction. The valve piston 3 is therefore pressure balanced. This means that it is always possible to move the valve piston 3 with low forces, regardless of the pressure requirements inside the valve. This is achieved by the shape of the valve piston 3, as well as by an internal connection of the two end faces of the piston. The pressure compensation of the valve piston 3 is realised by a nested bushing construction. This allows the use of a valve piston 3 with a larger diameter in the central area (A-port). Due to its symmetry, this offers the possibility of representing one seat in each direction of actuation. This ensures that a balance of forces (pressure equalisation) is present both when the valve piston is in contact with seat NB and seat A/C.

Figure 2:
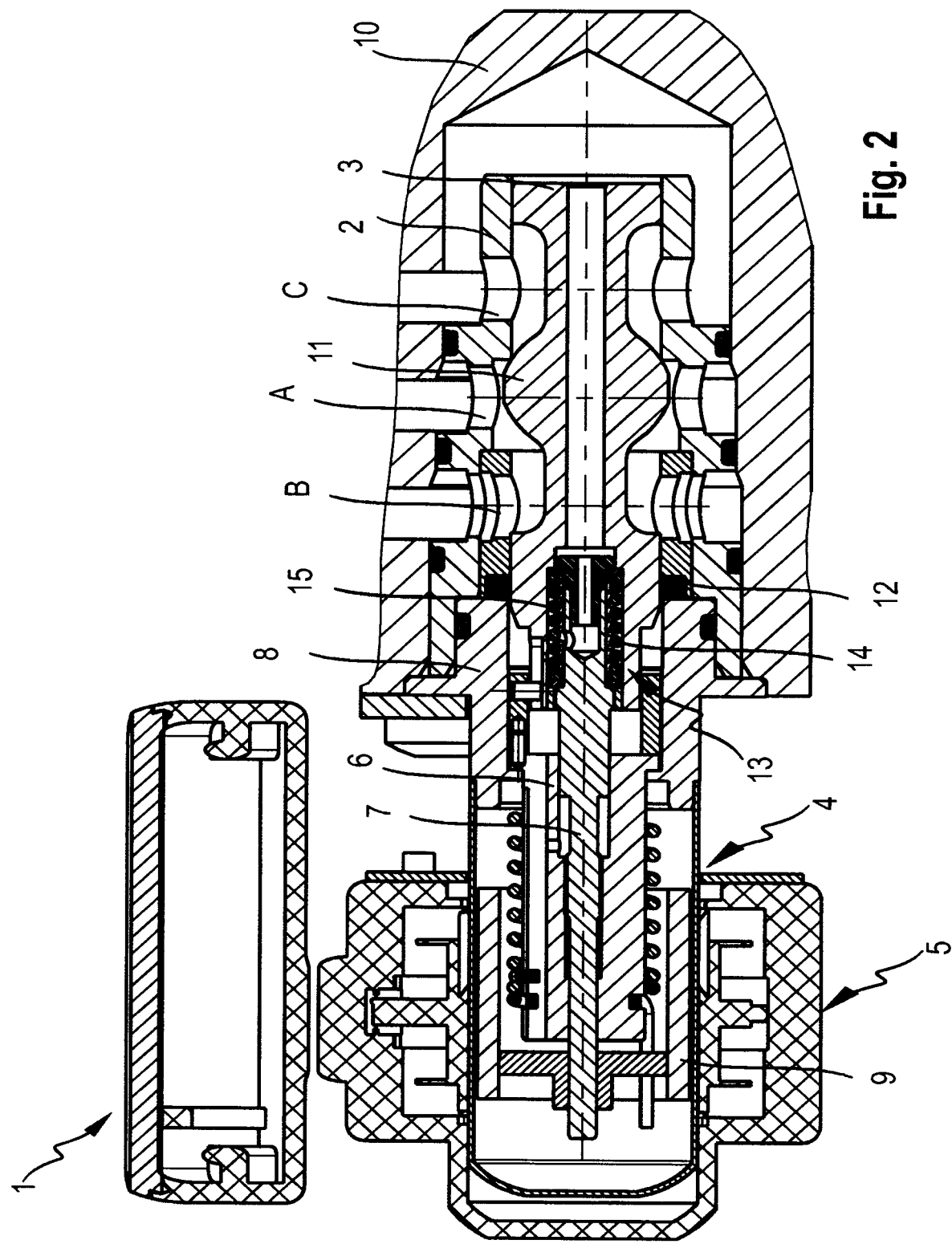
FIG. 2 a longitudinal section of the directional control valve according to FIG. 1.

As can be seen in particular from the longitudinal section according to FIG. 2, the valve piston 3 comprises a spherical section 11, whereby this can be abutted against the pressure port A on the valve housing 2 in order to seal off the respective, non-pressurised working port B or C. In other words, the directional control valve 1 comprises a ball seat to constitute the required high sealing tightness. The spherical locking body (section 11) reliably seals its respective seat on the valve housing 2, even if there are geometric errors or if there is an inclined position of the valve piston 3 due to movement clearance. Since the valve piston 3 is configured to be pressure balanced, a second seal is required on the valve piston 3 in order to separate the two working ports B, C from each other so that no medium can flow from the first working port B to the second working port C via the connection for pressure balancing the valve piston 3. This seal is a double-acting rod seal 12 or two single-acting rod seals arranged accordingly. The rod seal 12, which is characterised by minimal leakage as well as low actuating forces when the valve piston 3 is displaced, can additionally comprise a plastic ring. A defined preload (axial force) in the seat is required for the safe closing of the two valve seats. Since the drive by means of the drive spindle 7 basically does not provide any elasticity when it is retracted into the seat and can therefore lead to tensioning of the system, an additional assembly 13 is provided which acts in both actuation directions. This is characterised by a spiral spring 14 and a stepped mounting space 15. The stepped mounting space 15 makes it possible to provide two counter bearings on which the inserted assembly 13 can be supported. As a result, and depending on the spindle pitch of the spindle 8 and the spring constant, the same axial force acts on the respective valve seat in both actuation directions after the valve piston 3 abuts on the seat surface. In addition, the costs of individual parts can be reduced because the elastic component compensates cost-relevant influences, e.g. component tolerances.

Figure 3:
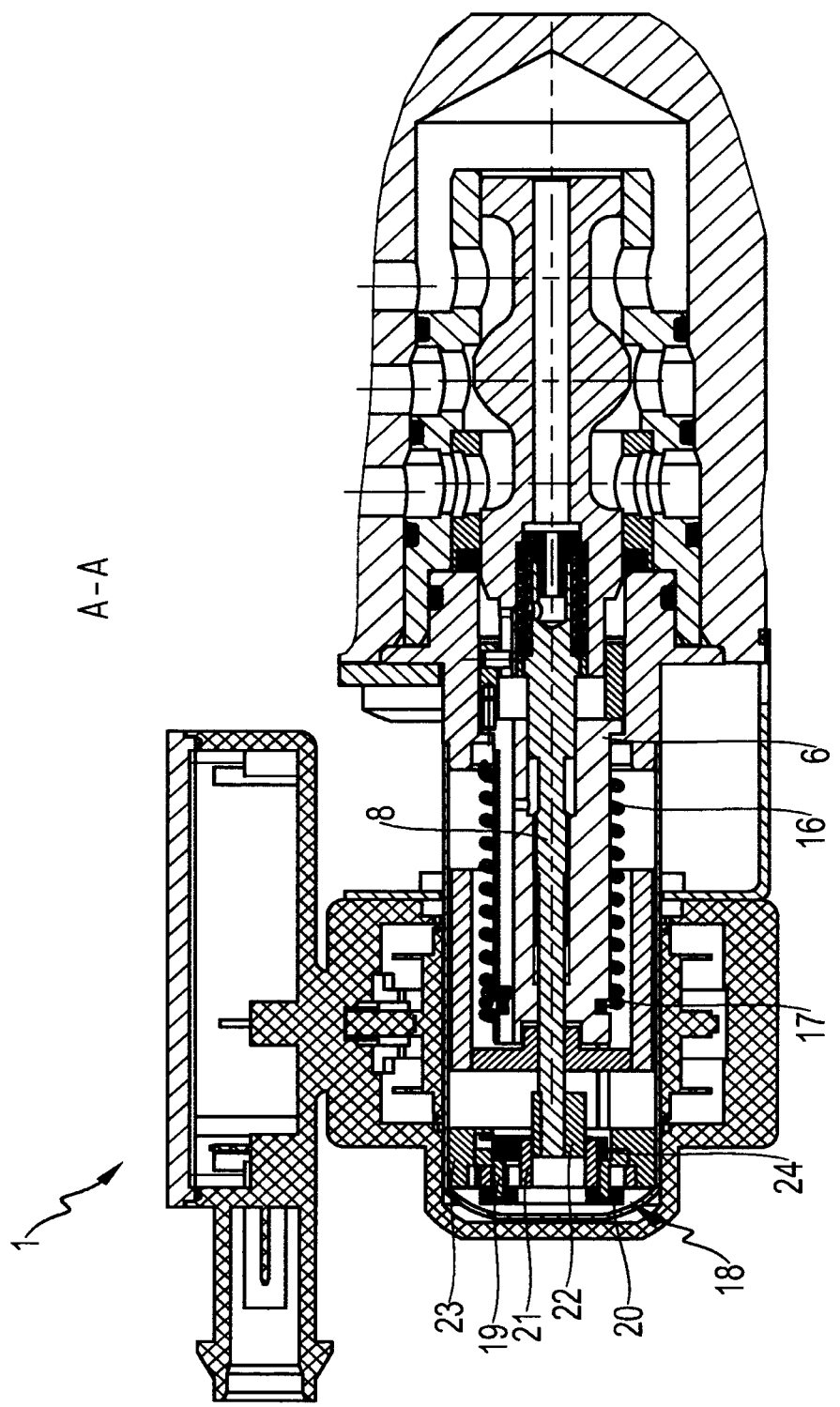
FIG. 3 a longitudinal section of a directional control valve according to a second embodiment.

FIG. 3 shows a longitudinal section of a second embodiment of a directional control valve 1 according to the invention. This is basically constructed in the same way as the first embodiment. Therefore, only the differences are described. In order to limit the stroke of the directional control valve 1 to a defined number of revolutions, a stop geometry is used, which is realised by two interlocking spiral bodies 16, 17. In order to sense the axial position of the drive spindle 8, a reduction gearbox (cycloid gearbox 18) is provided. This is characterised by a very large reduction gear ratio. Thus, with the correct choice of reduction gear ratio, the total number of revolutions can be reduced to exactly one revolution (max. 360°) on a rolling disc 19 (output disc). The detection of the absolute position can now be implemented via a 2-pole magnetic target 20 mounted on the rolling disc 19 as well as a 360° measuring Hall element positioned on the facing side, which is not shown. The cycloid gearbox 18 further comprises a cam plate 21, an eccentric 22, a cycloid plate 23 and a spring 24.

Figure 4:
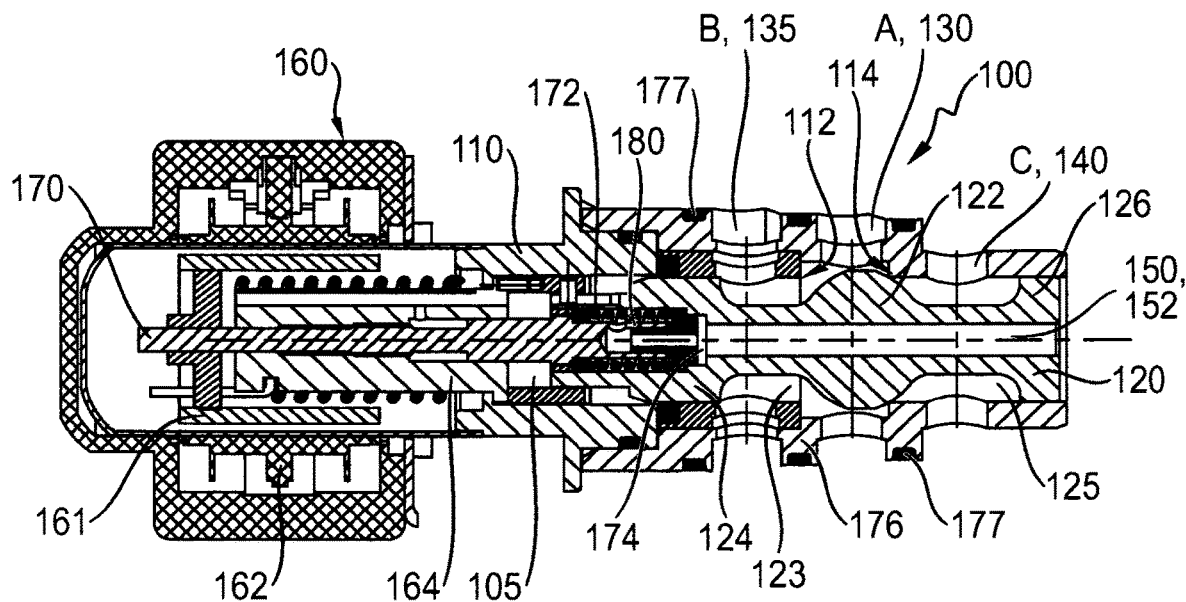
FIG. 4 a longitudinal section of a partial view of a proportional valve arrangement.

The FIG. 4 shows a longitudinal section of a partial view of a proportional valve arrangement 100 corresponding to the directional control valve 1 shown in FIGS. 1, 2 and 3. The proportional valve arrangement 100 is suitable for use with refrigerants and comprises a valve housing 110 comprising a valve body chamber 105 for receiving a valve body 3, 120. The valve body 120 is configured to be continuously transferable—like a continuous valve—within the valve body chamber 105. For actuating the proportional valve arrangement 100, an electrically operable drive 160 in the form of a stepper motor is provided for proportionally actuating the valve body 120. The rotor 9, 161 of the stepper motor is arranged inside the valve body chamber 105, while the stator 162 is arranged outside the valve body chamber 105.

The drive 160 drives a spindle 7, 170, which is connected to a hollow shaft 164 via a self-locking thread. The hollow shaft 164 in turn is connected to the valve body 120 and transfers the valve body 120 translationally. The valve body 120 comprises a spherical section 11, 122 which is transferable between a first sealing seat 112 and a second sealing seat 114. The valve body 120 has a first guide section 124 and a second guide section 126, which enables translational guidance of the valve body 120 within the valve housing 110. The spherical section 122 is located between the first guide section 124 and the second guide section 126.

The valve body 120 is guided within a cage-shaped bushing 176, which is arranged within the housing 10. The cage-shaped bushing 176 comprises a plurality of radial passages to allow fluid communication with the inflow and outflow ports (130, 135, 140). Seals 177 are disposed between the components of the cage-shaped bushing 176 and the housing 10. Overall, the valve housing 110 comprises an inflow port A, 130, a first outflow port B, 135 and a second outflow port C, 140.

Thus, the proportional valve arrangement 100 is configured as a 3/2 directional control valve, whereby the ports 130, 135, 140 are arranged directly adjacent to each other. By transferring the valve body 120 from the first sealing seat 112 to the second sealing seat 114, fluid can flow from the inflow port 130 into both the first outflow port 135 and/or the second outflow port 140. In particular, in conjunction with the force balanced arrangement, the valve body 120 is easily actuatable regardless of the position between the first sealing seat 112 and the second sealing seat 114. This also applies regardless of the fluid pressure situation which arises at the ports 130, 135, 140.

Within the housing 10 of the proportional valve arrangement 100, a first sealing seat 112 and a second sealing seat 114 are arranged on the cage-shaped bushing 176. The first sealing seat 112 and the second sealing seat 114 are located before and after the spherical section 122 of the valve body 120, thus providing two end positions of the proportional valve arrangement 100. The first sealing seat 112 and the second sealing seat 114 are respectively located on a first and a second component of the cage-shaped bushing 176, which are arranged coaxially with respect to each other. The components of the cage-shaped bushing 176 are insertable into each other in order to assemble the proportional valve arrangement 100, wherein the spherical section 122 is arranged therebetween.

Between the first guide section 124 and the spherical section 122, the valve body 120 forms a first clearance 123 within the cage-shaped bushing 176, which is characterised by a smaller diameter of the valve body 120 compared to the first guide section 124. In contrast, the spherical section 122 has a diameter which is configured to be slightly larger than the diameter of the first guide section 124. In addition, between the second guide section 126 and the spherical section 122, the valve body 120 forms a second clearance 125 within the cage-shaped bushing 176, which is characterised by a smaller diameter of the valve body 120 compared to the second guide section 126. The spherical section 122, in contrast, has a diameter which is also configured to be slightly larger than the diameter of the second guide section 126.

The valve body 120 comprises a pressure bypass 150 in order to provide a communication link 152 between the second outflow port 140 and the valve body chamber 105. This communication link 152 extends directly through the valve body 120 along the longitudinal axis of the valve body 120.

Within the communication link 152 of the valve body 120, there is a stepped mounting space 174 on the drive side. The stepped mounting space 174 partially receives the stem 170 therein. In addition, a locking device 180 is located in the stepped mounting space 174. The locking device 180 is arranged between the spindle 170 and the valve body 120, wherein the locking device 180 serves to generate an axial preload between the valve body 120 and the first sealing seat 112, provided that an abutment of the valve body 120 against the first sealing seat 112 occurs. At the same time, the locking device 180 serves to generate an axial preload between the valve body 120 and the second sealing seat 114, provided that an abutment of the valve body 120 against the second sealing seat 114 occurs. The locking device 180 thus provides an axial preload both when the valve body 120 abuts against the first sealing seat 112 and when the valve body 120 abuts against the second sealing seat 114, thereby ensuring a high degree of closing reliability of the proportional valve arrangement 100. When the spindle 170 is transferred to an end position, the locking device 180 prevents the valve body 120 from jamming in the sealing seat 112, 114 in the end position.

Figure 5:
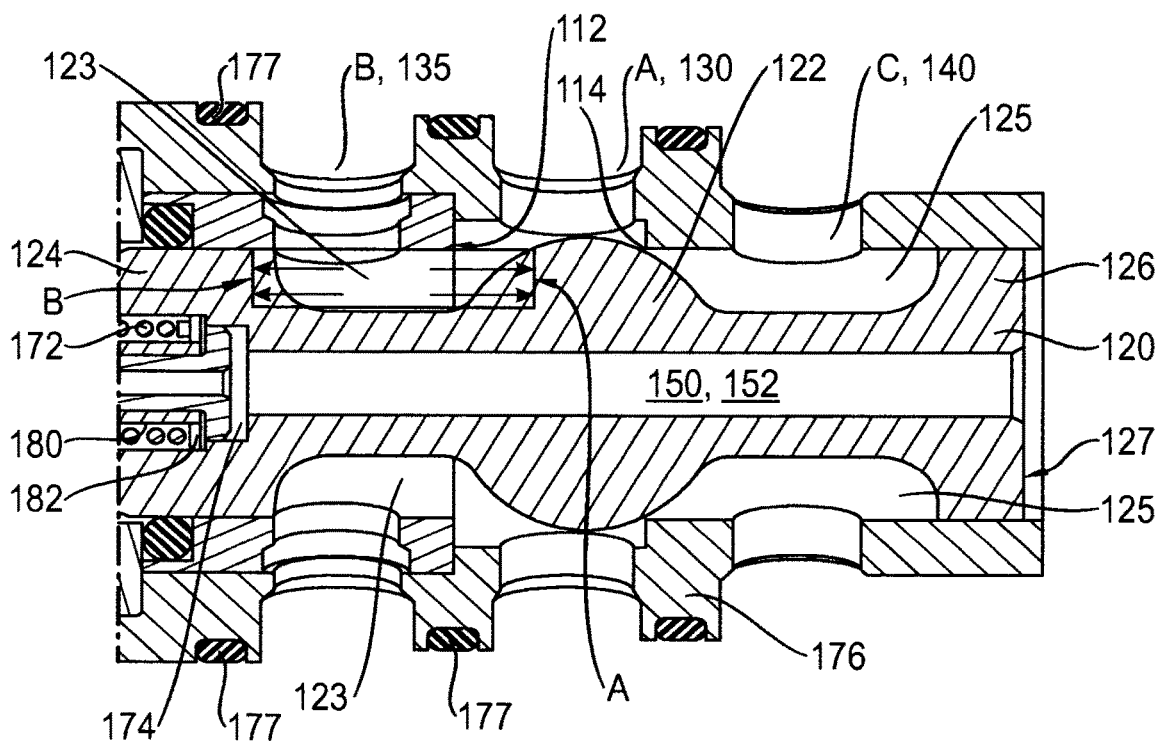
FIG. 5 an enlarged partial view of a proportional valve arrangement.

The FIG. 5 shows an enlarged partial view of a proportional valve arrangement 100. The valve body 120 is arranged within the cage-shaped bushing 176 and the spherical section 122 of the valve body 120 is located between the first sealing seat 112 and the second sealing seat 114 thereby providing the two end positions of the proportional valve arrangement 100. The first sealing seat 112 and the second sealing seat 114 are respectively located on a first and a second component of the cage-shaped bushing 176 and are arranged coaxially with respect to each other. The valve body 120 comprises the first guide section 124 and the second guide section 126, which enables the guidance of the valve body 120 in the cage-shaped bushing 176 in the valve housing 110. The spherical section 122 is located between the first guide section 124 and the second guide section 126. The valve body 120 abuts the second sealing seat 114.

When the valve body 120 abuts against the first sealing seat 112, an axial projection surface (B) of the valve body 120 from the first clearance 123 in the direction of the first guide section 124 comprises the same size as an axial projection surface (A) from the first clearance 123 in the direction of the spherical section 122, whereby the axial projection surface (A) is delimited in radial direction by the first sealing seat 112. This results in a balance of forces since the axial components of the projection surfaces (A, B) comprise the same size in this state. If, for example, fluid pressure from outside the proportional valve arrangement 100 is present at the first outflow port B, 135, this results in a balance of forces of the valve body 120 in the axial direction within the proportional valve arrangement 100. This makes it much easier for the electric drive 160 to move the valve body 120 or to transfer it from a first position to a second position.

On the opposite side of the spherical section 122 of the valve body 120, a second clearance 125 is provided between the second guide section 126 and the spherical section 122. When the valve body 120 is in abutment with the second sealing seat 114, an axial projection surface of the valve body 120, which is projected from the second clearance 125 towards the spherical section 122 and which is delimited in the radial direction by the second sealing seat 114, and a front side projection surface 127 to the second guide section 126 correspond to the size of an axial projection surface from the second clearance 125 towards the second guide section 126 and the axial projection surface from the valve body chamber 105 towards the first guide section 124. If, for example, fluid pressure from outside the proportional valve arrangement 100 is applied to the second outflow port C, 140, a balance of forces also results because the sum of the axial components of the projection surfaces are identical. At fluid pressure, this results in a balance of forces of the valve body 120 in the axial direction, which greatly simplifies it for the electric drive 160 to move the valve body 120 or to transfer it from a first position to a second position.

The FIGS. 6A, 6B and 6C show further partial views of a proportional valve arrangement 100 in various switching positions. The valve body 120 is disposed within the cage-shaped bushing 176, and the spherical section 122 of the valve body 120 is located between the first sealing seat 112 and the second sealing seat 114, thereby providing two end positions of the proportional valve arrangement 100. The first sealing seat 112 and the second sealing seat 114 are respectively located on a first and a second component of the cage-shaped bushing 176 and are arranged coaxially with respect to each other. The valve body 120 includes the first guide section 124 and the second guide section 126, which enables the valve body 120 to be guided translationally in the cage-shaped bushing 176 in the valve housing 110.

The FIG. 6A shows the valve body 120 abutting the first sealing seat 112, thereby allowing fluid communication from the inflow port 130 to the second outflow port 140. The valve body 120 comprises a stepped mounting space 174 for receiving the spindle 170 and the locking device 180. The spindle 170 is connected to the hollow shaft 164 (not shown) in a self-locking manner and transmits an axial movement to the valve body 120. Due to the self-locking between the hollow shaft 164 and the spindle 170, no self-acting adjustment of the position of the valve body 120 is possible, for example due to pressure fluctuations in the fluid or other external influences. The locking device 180 comprises a spring element 172, which is arranged coaxially with respect to the spindle 170 and is located within the stepped mounting space 174. The spring element 172 is arranged between two disc bodies 181, 182. The stepped mounting space 174 has a main diameter which serves to accommodate the two disc bodies 181, 182 including the spring element 172 arranged between the disc bodies 181, 182. In addition, the stepped mounting space 174 comprises a section with a secondary diameter which is smaller than the main diameter. The two disc bodies 181, 182 cannot enter the section with the minor diameter, rather they are pressed by the spring force of the spring element 172 onto a first stop 175A, which defines the step of the transition from the main diameter to the minor diameter within the stepped mounting space 174. At the spindle end of the stepped mounting space 174 there is a second stop 175B in the form of a spacer sleeve which, analogous to the first stop 175A, realises the main diameter and the smaller secondary diameter. Also at the spacer sleeve, the two disc bodies 180, 182 cannot enter the section with the secondary diameter, but are pressed onto a second stop 175B by the spring force of the spring element 172.

In FIG. 6A, the spindle 170 is in a retracted position, whereby the valve body 120 is axially biased against the first sealing seat 112 by the spring force of the spring element 172 when the first disc body 181 comes into contact with the second stop 175B in the form of the spacer sleeve. The spindle 170 can therefore continue to move at least partially in the axial direction against the preload of the spring element 172 when the valve body 120 has already come into abutment with the first sealing seat 112. This dampens the axial movement of the spindle 170, which prevents the valve body 120 from jamming in the end position.

The FIG. 6B shows the valve body 120 spaced from both the first sealing seat 112 and the second sealing seat 114, thereby allowing fluid communication from the inflow port 130 to the first outflow port 135 and to the second outflow port 140.

The FIG. 6C shows the valve body 120 abutting the second sealing seat 114, thereby allowing fluid communication from the inflow port 130 to the first outflow port 135. The spindle 170 is in a position advanced towards the stepped mounting space 174. The valve body 120 is axially biased against the second sealing seat 114 by the spring force of the spring element 172 when the second disc body 182 stops against the first stop 175A. The spindle 170 can therefore continue to move at least partially in the axial direction against the preload of the spring element 172—i.e. plunge deeper into the stepped mounting space 174—when the valve body 120 has already come into abutment with the second sealing seat 114. This dampens the axial movement of the spindle 170, which prevents the valve body 120 from jamming in the end position.

The stepped mounting space 174 is an integral part of the communication link 152, which extends in longitudinal direction through the valve body 120. Thus, the pressure bypass 150 extends through the valve body 120, through the stepped mounting space 174 and thus through the locking device 180, thus resulting in a compact construction and a simple as well as symmetrical pressure compensation of the fluid, which altogether enables the force-balanced constellation of the valve body 120.

Since the devices and methods described in detail above are examples of embodiments, they can be modified to a wide extent by the skilled person in the usual manner without departing from the scope of the invention. In particular, the mechanical arrangements and the proportions of the individual elements with respect to each other are merely exemplary. Some preferred embodiments of the apparatus according to the invention have been disclosed above. The invention is not limited to the solutions explained above, but the innovative solutions can be applied in different ways within the limits set out by the claims.

The invention claimed is:

1. A proportional valve arrangement for refrigerant, comprising:
   a valve housing comprising a valve body chamber, and
   a valve body arranged within the valve body chamber, the valve body configured to be transferable between a first position and a second position,
   wherein the valve housing comprises a first sealing seat and a second sealing seat, and the valve body is arranged to be transferable between the first sealing seat and the second sealing seat, wherein the valve body comprises a first guide section, a second guide section, and a spherical section arranged between the first guide section and the second guide section, the first guide section and the second guide section configured to guide the valve body in the valve housing and the spherical section arranged to be transferable between abutment with the first sealing seat and abutment with the second sealing seat, and wherein no return spring acting on the second guide section for closing the proportional valve arrangement is provided in the proportional valve arrangement, wherein the valve housing comprises an inflow port, a first outflow port and a second outflow port, and wherein the proportional valve arrangement comprises a pressure bypass connecting the second outlet port to the valve body chamber.

2. The proportional valve arrangement according to claim 1, further comprising a first clearance formed between the first guide section and the spherical section.

3. The proportional valve arrangement according to claim 2, wherein in a state in which the valve body abuts the first sealing seat, an axial projection surface of the first clearance in a direction of the first guide section comprises a same size as an axial projection surface of the first clearance in a direction of the spherical section.

4. The proportional valve arrangement according to claim 1, further comprising a second clearance formed between the second guide section and the spherical section.

5. The proportional valve arrangement according to claim 4, wherein in a state in which the valve body abuts the second sealing seat, an axial projection surface of the second clearance in a direction of the spherical section comprises a same size as an axial projection surface of the second clearance in a direction of the second guide section.

6. The proportional valve arrangement according to claim 1, wherein the pressure bypass comprises a communication link through the valve body.

7. The proportional valve arrangement according to claim 1, wherein the proportional valve arrangement comprises an electrically actuable drive configured to proportionally actuate the valve body.

8. The proportional valve arrangement according to claim 7, wherein the drive is at least partially arranged within the valve body chamber.

9. The proportional valve arrangement according to claim 7, wherein the drive comprises a stepper motor connected to the valve body via a spindle.

10. The proportional valve arrangement according to claim 9, wherein the spindle is arranged connected to a hollow shaft in a self-locking manner.

* * * * *